(12) United States Patent  
Inoue et al.

(10) Patent No.: US 9,264,612 B2  
(45) Date of Patent: Feb. 16, 2016

(54) IMAGING APPARATUS AND PHOTOGRAPHING SUPPORT METHOD

(71) Applicant: FUJIFILM Corporation, Tokyo (JP)

(72) Inventors: Kazuki Inoue, Saitama (JP); Shigeru Kondou, Saitama (JP); Takashi Aoki, Saitama (JP); Hiroyuki Oshima, Saitama (JP); Daisuke Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/497,636

(22) Filed: Sep. 26, 2014

(65) Prior Publication Data

US 2015/0009393 A1    Jan. 8, 2015

Related U.S. Application Data

(63) Continuation of application No. PCT/JP2013/053370, filed on Feb. 13, 2013.

(30) Foreign Application Priority Data

Mar. 28, 2012   (JP) ................................ 2012-074312

(51) Int. Cl.
*G03B 23/02* (2006.01)
*H04N 5/232* (2006.01)
(Continued)

(52) U.S. Cl.
CPC .............. *H04N 5/23238* (2013.01); *G02B 7/28* (2013.01); *G03B 13/36* (2013.01); *G03B 17/20* (2013.01); *H04N 5/23293* (2013.01); *H04N 5/23212* (2013.01)

(58) Field of Classification Search
CPC .......... H04N 5/23238; H04N 5/23293; H04N 5/23212; G03B 13/16; G03B 13/02; G03B 13/06

See application file for complete search history.

(56) References Cited

U.S. PATENT DOCUMENTS 5,161,025 A    11/1992  Nakao
6,765,618 B1    7/2004  Sato
(Continued)

FOREIGN PATENT DOCUMENTS

JP          3-292067 A    12/1991
JP          5 127244 A     5/1993
(Continued)

OTHER PUBLICATIONS

International Search Report, issued in PCT/JP2013/053370, dated Mar. 12, 2013.

(Continued)

*Primary Examiner* — Tuan Ho
(74) *Attorney, Agent, or Firm* — Birch, Stewart, Kolasch & Birch, LLP

(57) ABSTRACT

A digital camera 10 includes an imaging device 21a, a finder device 15, a phase difference information analyzing portion 71 and a control portion 32. In the finder device 15, an image in which an OVF optical image formed by an objective optical system 65 and an image displayed on a display portion 61 are superimposed on each other can be observed through an eyepiece window 17. The phase difference information analyzing portion 71 determines a focus region and a non-focus region in a photographic subject imaged by the imaging device 21a. The control portion 32 makes control to display an image Eg for highlighting the focus region E in the OVF optical image on the display portion 61 in the state in which the OVF optical image can be observed through the eyepiece window 17.

5 Claims, 11 Drawing Sheets

(51) Int. Cl.
  *G02B 7/28* (2006.01)
  *G03B 13/36* (2006.01)
  *G03B 17/20* (2006.01)

(56) References Cited

U.S. PATENT DOCUMENTS

| | | | | |
|---|---|---|---|---|
| 2015/0022706 A1* | 1/2015 | Jogetsu | ............... | G03B 13/06 348/333.09 |
| 2015/0049236 A1* | 2/2015 | Kim | ............... | G03B 17/20 348/333.09 |
| 2015/0130982 A1* | 5/2015 | Misawa | ............... | G03B 13/06 348/333.08 |

FOREIGN PATENT DOCUMENTS

| | | |
|---|---|---|
| JP | 6-22185 A | 1/1994 |
| JP | 2000-121922 A | 4/2000 |
| JP | 2003-241067 A | 8/2003 |
| JP | 2006-109199 A | 4/2006 |
| JP | 2006-166358 A | 6/2006 |
| JP | 2008-135812 A | 6/2006 |
| JP | 2010-206429 A | 9/2010 |

OTHER PUBLICATIONS

Written Opinion of International Preliminary Examining Authority issued in PCT/JP2013/053370, dated Jun. 25, 2013.
Written Opinion of International Preliminary Report on Patentability issued in PCT/JP2013/053370, dated Jul. 11, 2014.
Written Opinion of the International Searching Authority, issued in PCT/JP2013/053370, dated Mar. 12, 2013.
Foreign Office Action of Japanese Application No. JP2014-507504 issued on Dec. 2, 2014.

* cited by examiner

PHOTOGRAPHIC IMAGE

COMPOSITE IMAGE a

COMPOSITE IMAGE d

Eb (BLACK)

FINDER OBSERVATION IMAGE
(OVF OPTICAL IMAGE + COMPOSITE IMAGE a)

E+Eg

FINDER OBSERVATION IMAGE
(OVF OPTICAL IMAGE + COMPOSITE IMAGE b)

FINDER OBSERVATION IMAGE
(OVF OPTICAL IMAGE + COMPOSITE IMAGE c)

PHOTOGRAPHIC IMAGE

E

COMPOSITE IMAGE f

INDER OBSERVATION IMAGE
(OVF OPTICAL IMAGE + COMPOSITE IMAGE f)

FINDER OBSERVATION IMAGE
(IN THE STATE IN WHICH SHUTTER IS HALF CLOSED)

IMAGING APPARATUS AND PHOTOGRAPHING SUPPORT METHOD

CROSS REFERENCE TO RELATED APPLICATION

This is a continuation of International Application No. PCT/JP2013/053370 filed on Feb. 13, 2013, and claims priority from Japanese Patent Application No. 2012-074312 filed on Mar. 28, 2012, the entire disclosures of which are incorporated herein by reference.

TECHNICAL FIELD

The present invention relates to an imaging apparatus and a photographing support method.

BACKGROUND ART

In the background art, an optical finder is also provided in a digital camera which stores, on a recording medium, photographic image data obtained by digital processing applied to a photographic image signal outputted from a solid state imaging device. A photographer can look into the finder to visually check the composition of a photographic subject etc. and push a shutter button.

However, a typical digital camera in recent years is not provided with an optical finder but displays a photographic image, which is being taken by a solid state imaging device, on a large-sized liquid crystal display device provided in the back surface of the camera in place of the finder.

In the digital camera of the type in which a live-view image is displayed on the large-sized liquid crystal display device in the back surface of the camera, the photographer needs to look into the camera with his/her face away from the camera in order to check the photographic image. Thus, camera shake occurs easily when the photographer pushes a shutter button. In addition, the live-view image which has been outputted from the solid state imaging device and subjected to image processing is displayed. Therefore, the image cannot help including a slight time lag with respect to an actual state of the photographic subject.

From such a circumstance, many camera fans are hoping for the optical finder to be back. To this end, there has been proposed a digital camera mounted with a finder device which includes a display portion so that an image in which an image displayed on the display portion is superimposed on an optical image obtained through an objective optical system can be observed through an eyepiece window, for example, as described in Patent Literature 1.

In addition, another digital camera of the type in which a live-view image is displayed on the large-sized liquid crystal display device in the back surface of the camera is described in Patent Literature 2 or 3.

In the digital camera described in Patent Literature 2 or 3, an in-focus position, a front focus portion, and a rear focus portion in a photographic subject are determined from an image taken by an imaging device, and results thereof are displayed with different colors on the photographic image displayed on the display device in the back surface of the camera.

CITATION LIST

Patent Literature

Patent Literature 1: JP-A-3-292067
Patent Literature 2: JP-A-2010-206429
Patent Literature 3: JP-A-2008-135812

SUMMARY OF INVENTION

Technical Problem

According to the digital camera described in Patent Literature 2 or 3, the focus region in the photographic subject can be confirmed on the display device in the back surface of the camera. Based on the information, therefore, a photographer can instantaneously grasp where is in focus, so that high convenience can be provided.

However, the digital camera described in Patent Literature 2 or 3 is of the type in which a live-view image is displayed on the large-sized liquid crystal display device in the back surface of the camera. Therefore, camera shake occurs easily when a shutter button is pushed, as described above.

The aforementioned problem of the camera shake can be solved by use of a configuration in which Patent literature 2 or 3 is applied to Patent Literature 1 so that a photographic image can be displayed on the display portion built in the finder device described in Patent Literature 1 so as to be colored in accordance with its focus state.

In the aforementioned configuration, however, the photographic image having a slight time lag with respect to an actual state of the photographic subject is displayed on the display portion. Therefore, there is a possibility that intended photographing cannot be performed.

The invention has been accomplished in consideration of the aforementioned circumstances. An object of the invention is to provide an imaging apparatus and a photographing support method by which a focus state in a photographic subject can be intuitively known while an actual state of the photographic subject is confirmed.

Solution to Problem

According to the invention, an imaging apparatus includes: an imaging device which images a photographic subject; an optical finder through which a photographic subject optical image formed by an optical system can be observed; a display portion which displays an image and is provided inside the optical finder so that an image in which the photographic subject optical image and the image are superimposed on each other can be observed; a focus state determining portion which determines a focus region and a non-focus region in a photographic subject using a photographic image obtained from the photographic subject imaged by the imaging device; and a control portion which makes control to display an image for highlighting the focus region in the photographic subject optical image as the image on the display portion in the state in which the photographic subject optical image can be observed through the optical finder.

According to the configuration, which portion in the photographic subject is in focus can be highlighted by the image which is displayed on the display portion and which is superimposed on the photographic subject optical image. Accordingly, a focus state in the photographic subject can be known intuitively. In addition, due to the configuration in which the image displayed on the display portion is superimposed on the photographic subject optical image, proper use can be performed easily in such a manner that the display of the display portion is cancelled so that only the photographic subject optical image can be confirmed, or the image is displayed on the display portion so that the photographic subject optical image and the focus state can be confirmed. Accordingly, it is possible to achieve a user-friendly imaging apparatus.

A photographing support method performed by an imaging apparatus according to the invention is a photographing support method performed by an imaging apparatus including an imaging device which images a photographic subject, an optical finder through which a photographic subject optical image formed by an optical system can be observed, and a display portion which displays an image and is provided inside the optical finder so that an image in which the photographic subject optical image and the image are superimposed on each other can be observed, the method including: a focus state determining step of determining a focus region and a non-focus region in a photographic subject using a photographic image obtained from the photographic subject imaged by the imaging device; and a control step of making control to display an image for highlighting the focus region in the photographic subject optical image, as the image on the display portion in the state in which the photographic subject optical image can be observed through the optical finder.

Advantageous Effects of Invention

According to the invention, it is possible to provide an imaging apparatus and a photographing support method by which a focus state in a photographic subject can be known intuitively while an actual state of the photographic subject is confirmed.

DESCRIPTION OF EMBODIMENT

An embodiment of the invention will be described below with reference to the drawings.

Figure 1:
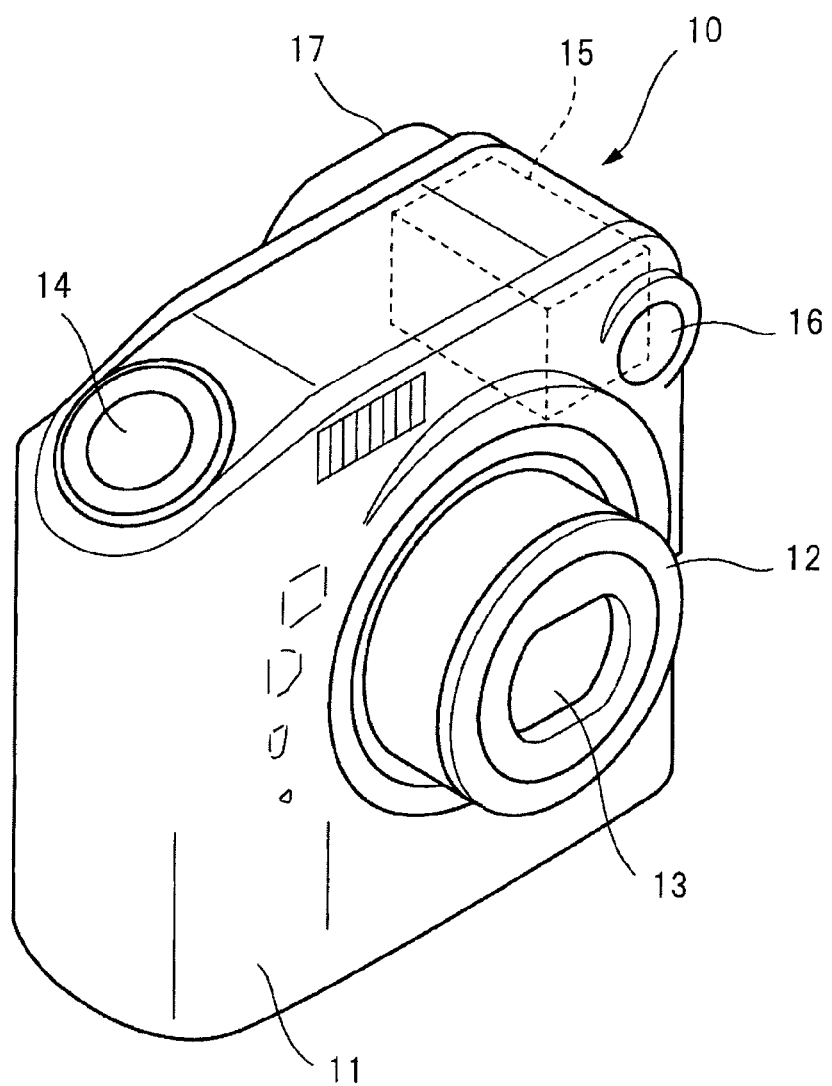
[FIG. 1] A perspective view showing the external appearance of a digital camera as an imaging apparatus for describing a first embodiment of the invention.

FIG. 1 is a perspective view showing the external appearance of a digital camera as an imaging apparatus for describing a first embodiment of the invention.

A digital camera 10 includes a rectangular housing 11. A lens barrel 12 is provided in the center of a front surface of the housing 11. A photographing lens (including a focus lens, a zoom lens, etc. for adjusting a focal position) 13 is received in the lens barrel 12.

A shutter release button 14 is provided on one side of an upper end surface of the housing 11. A finder device 15 is provided in an opposite corner to the shutter release button 14 in the upper end surface of the housing 11. A photographic subject-side finder window 16 of the finder device 15 is provided in a corner portion of the front surface of the housing 11. An eyepiece window 17 of the finder device 15 is provided in a back surface-side portion of the housing 11 opposite to the photographic subject-side finder window 16.

Figure 2:
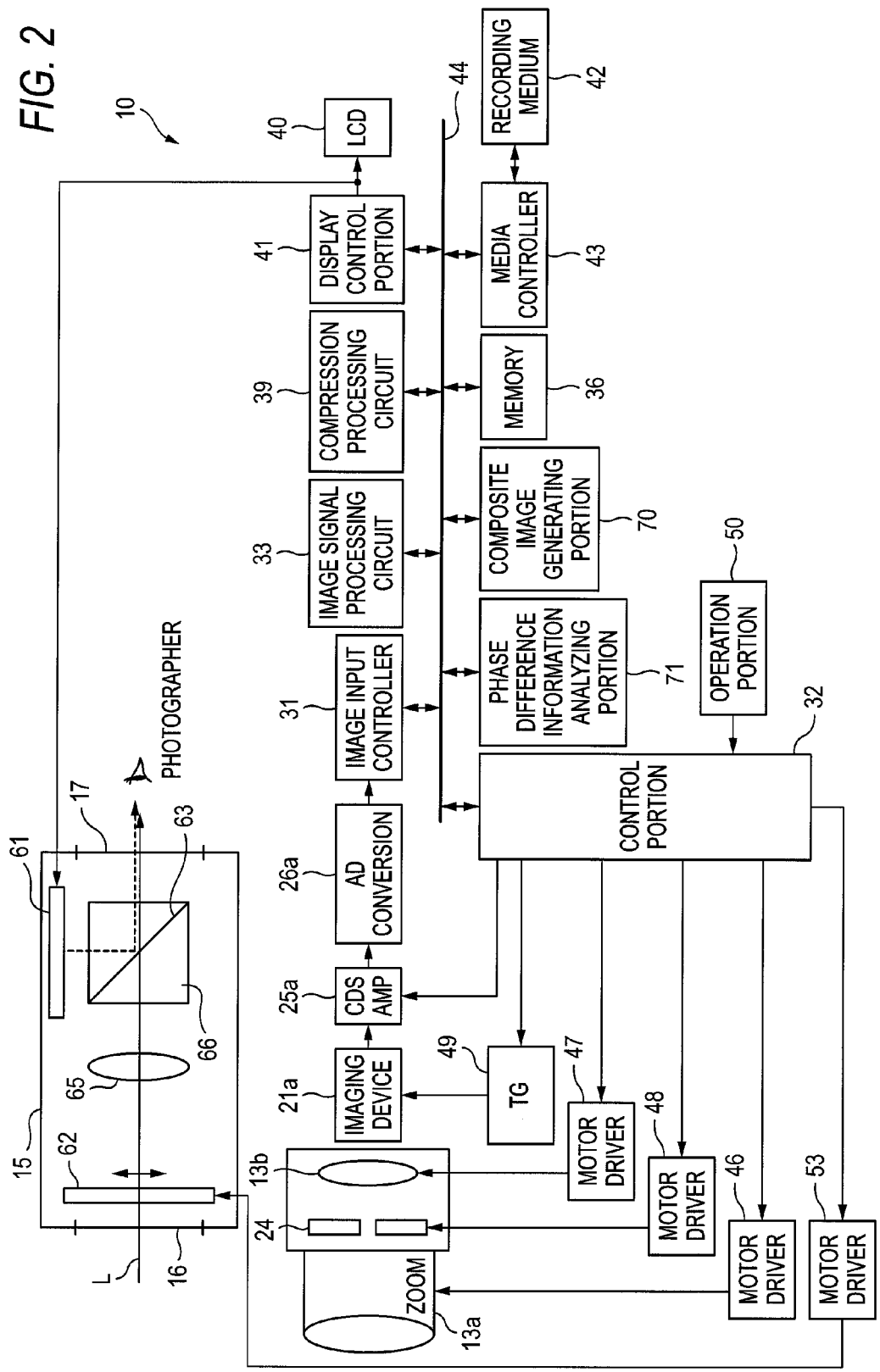
[FIG. 2] An internal block configuration diagram of the digital camera 10 shown in FIG. 1.

FIG. 2 is an internal block configuration diagram of the digital camera 10 shown in FIG. 1.

In FIG. 2, the digital camera 10 includes a CCD-type solid state imaging device 21a, a photographing optical system placed in a pre-stage of the solid state imaging device 21a, a CDSAMP 25a which applies analog signal processing to an output signal (photographic image signal) of the solid state imaging device 21a, an analog-to-digital (A/D) converter 26a which converts an output signal of the CDSAMP 25a into a digital signal, and the finder device 15. The photographing optical system is configured to include the photographing lens 13 (in which the zoom lens is designated as 13a and the focus lens is designated as 13b), and a diaphragm (iris) 24.

Incidentally, although the solid state imaging device 21a is of a CCD type in the example of FIG. 2, it may be a solid state imaging device of another type such as a CMOS type.

A solid state imaging device in which pairs of phase difference detecting pixel cells (pixel cells for detecting phase difference) are provided discretely all over an imaging area is used as the solid state imaging device 21a.

For example, each pair of phase difference detecting pixel cells are two paired pixel cells whose light-shielding film apertures are provided eccentrically in opposite directions to each other.

In this manner, one pixel cell of the pair receives incident light from a photographic subject seen by a right eye (or left eye) and the other pixel cell of the pair receives incident light from the photographic subject seen by a left eye (or right eye). Accordingly, a focus state of the photographic subject or distances to individual objects included in the photographic subject can be detected separately based on signals acquired from the pair.

Such phase difference detecting pixel cells have been already known, for example, in JP-A-2011-232371, JP-A-2011-227388, etc. The phase difference detecting pixel cells are usually used for a phase difference AF system in the field of digital cameras.

The finder device 15 includes the photographic subject-side finder window 16, the eyepiece window 17, an OVF shutter 62, an objective optical system 65, a prism 66 including a half mirror 63, and a display portion 61.

The OVF shutter 62, the objective optical system 65, and the prism 66 are disposed in the named order between the photographic subject-side finder window 16 and the eyepiece window 17 along an optical axis L of incident light of the finder device 15.

The OVF shutter 62 is provided insertably/retractably onto/from an optical path along the optical axis L. The OVF shutter 62 can take either a closed state in which the OVF shutter 62 is inserted onto the optical path of the finder device 15 or an open state in which the OVF shutter 62 is retracted from the optical path of the finder device 15.

In the closed state, the OVF shutter 62 is inserted in a position to cover the photographic subject-side finder window 16. Therefore, in the closed state, light incident on the photographic subject-side finder window 16 is blocked by the OVF shutter 62 so that incidence of the light onto the eyepiece window 17 can be prohibited.

In addition, in the open state, the OVF shutter 62 is retracted to a position not to cover the photographic subject-side finder window 16. Therefore, in the open state, light incident on the photographic subject-side finder window 16 passes without being blocked by the OVF shutter 62 so that an OVF optical image formed by the objective optical system 65 can be incident on the eyepiece window 17.

Incidentally, the OVF shutter 62 may be a light absorbing or reflecting plate-like member which can be mechanically moved in/out or may be a device (for example, a liquid crystal shutter) whose transmissivity can be electrically controlled.

The half mirror 63 is disposed obliquely at an angle of 45 degrees with respect to the optical axis L.

The display portion 61 is constituted, for example, by a liquid crystal display device. The display portion 61 is disposed adjacently to the half mirror 63 and in parallel with the optical axis L. The display portion 61 transmits light from a backlight only in a portion where an image is to be displayed on a display screen but does not transmit the light from the backlight in the other portion (makes a black display therein), so as to display the image.

Thus, in the state in which the OVF shutter 62 is in the open state and an image is displayed on the display portion 61, an image in which incident light (an OVF optical image) from the photographic subject transmitted through the half mirror 63 is superimposed on light (an EVF image displayed on the display portion 61) emitted from the display portion 61 and reflected by the half mirror 63 can be checked through the eyepiece window 17.

Incidentally, the finder device 15 maybe a device from which the prism 66 and the display portion 61 have been removed and in which a see-through type display portion is disposed in the position where the prism 66 was located so that a display surface of the display portion can be perpendicular to the optical axis L.

The digital camera 10 includes a motor driver 46, a motor driver 47, a motor driver 48, a motor driver 53 and a timing generator (TG) 49. The motor driver 46 supplies a drive pulse to a drive motor of the zoom lens 13a. The motor driver 47 supplies a drive pulse to a drive motor of the focus lens 13b. The motor driver 48 supplies a drive signal to a drive motor which performs diaphragm control of the diaphragm 24. The motor driver 53 supplies a drive signal to a drive motor which performs position control of the OVF shutter 62. The TG 49 supplies a drive timing pulse to the solid state imaging device 21a. The motor drivers 46, 47, 48 and 53 and the TG 49 operate based on commands from a control portion 32. In addition, the CDSAMP 25a also operates based on a command from the control portion 32.

The digital camera 10 further includes an image input controller 31, the control portion 32, an image signal processing circuit 33, a memory 36, a compression processing circuit 39, a display control portion 41, a media controller 43, a composite image generating portion 70, a phase difference information analyzing portion 71, and a bus 44. The image input controller 31 imports a digital photographic image signal outputted from the A/D converter 26a. The control portion 32 generally controls the digital camera 10 as a whole. The image signal processing circuit 33 applies image processing to the photographic image signal imported by the image input controller 31 to generate photographic image data. The memory 36 includes an RAM used as a work memory, an ROM storing various data, etc. The compression processing circuit 39 compresses the photographic image data which have been subjected to image processing into a JPEG image or an MPEG image. The display control portion 41 displays a photographic image or a live-view image on a liquid crystal display device 40 provided in the back surface of the camera etc. or displays various images on the display portion 61 inside the finder device 15. The media controller 43 records the photographic image data onto a recording medium 42. The image input controller 31, the control portion 32, the image signal processing circuit 33, the memory 36, the compression processing circuit 39, the display control portion 41, the media controller 43, the composite image generating portion 70 and the phase difference information analyzing portion 71 are connected to one another through the bus 44.

The phase difference information analyzing portion 71 determines, of an imaged photographic subject, a focus region which is in focus and a non-focus region which is not in focus, by use of signals detected by the phase difference detecting pixel cells included in the imaging device 21a.

In addition, using signals detected by the phase difference detecting pixel cells located in a designated range (hereinafter referred to as AF area) on an imaging area where the pixels cells of the imaging device 21a are disposed, the phase difference information analyzing portion 71 calculates a moving distance of the focus lens 13b which is required for focusing on a region where the photographic subject is imaged in the AF area. The phase difference information analyzing portion 71 then transmits information about the moving distance to the control portion 32.

The composite image generating portion 70 acquires photographic image data obtained by processing by the image signal processing circuit 33, and generates composite image data based on the photographic image data and a result of the determination of the focus region and the non-focus region made by the phase difference information analyzing portion 71.

Figure 3:
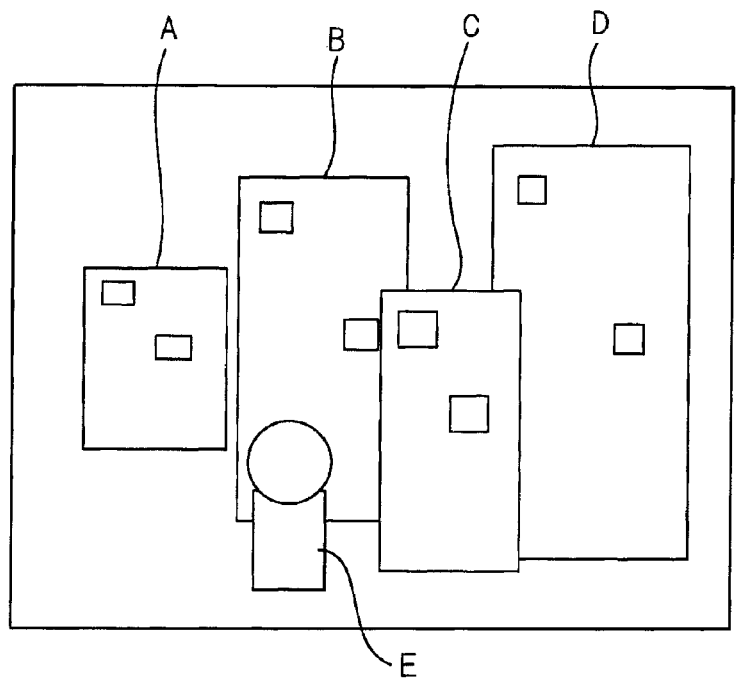
[FIG. 3] A view showing photographic image data obtained by imaging a photographic subject in which buildings A to D and a person E are included as objects.

For example, assume that photographic image data obtained by processing by the image signal processing circuit 33 are shown in FIG. 3. Photographic image data obtained by imaging a photographic subject in which buildings A to D and a person E are included as objects are shown in FIG. 3.

Figure 4:
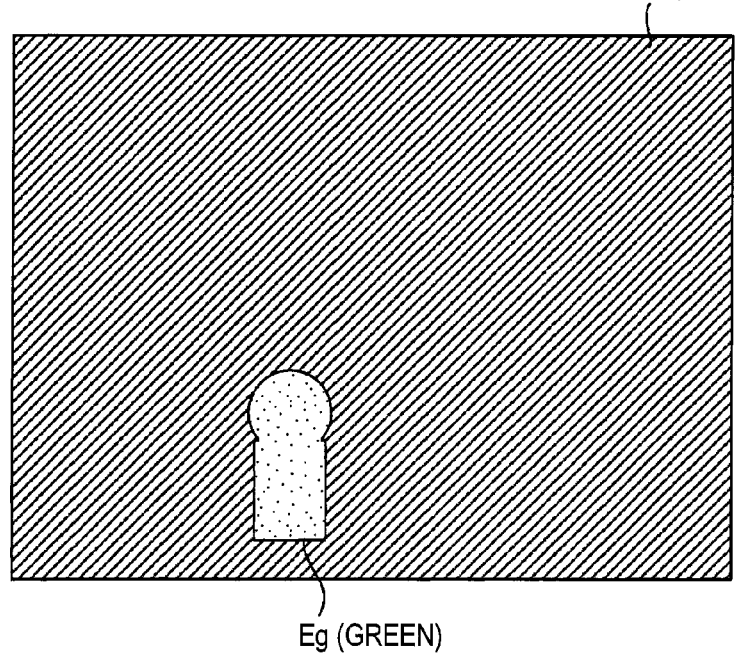
[FIG. 4] A view showing an example of composite image data generated by a composite image generating portion 70 shown in FIG. 2.

When the phase difference information analyzing portion 71 determines that the person E is a portion corresponding to the focus region and the other portion than the person E is a portion corresponding to the non-focus region in the photographic image data shown in FIG. 3, the composite image generating portion 70 cuts out the person E from the photographic image data shown in FIG. 3 to generate composite image data a in which the other portion than the person E is made into a black image Fb and the portion of the cut-out person E is made into another color image than black e.g. a green image Eg as shown in FIG. 4.

Figure 5:
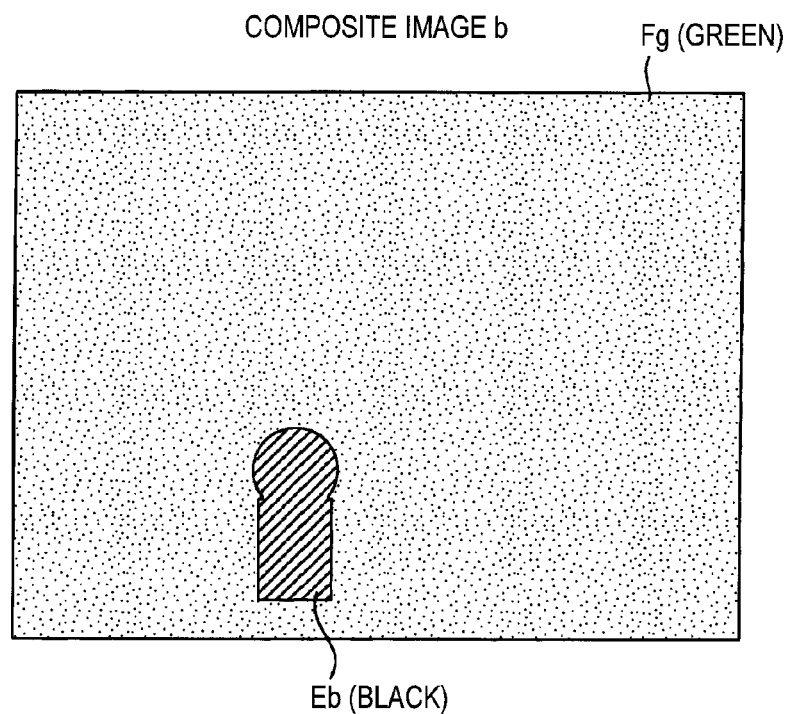
[FIG. 5] A view showing an example of composite image data generated by the composite image generating portion 70 shown in FIG. 2.

Or the composite image generating portion 70 cuts out the other portion than the person E from the photographic image data shown in FIG. 3 to generate composite image data b in which the other portion than the person E is made into another color image than black, e.g. a green image Fg and the portion of the person E is made into a black image Eb as shown in FIG. 5.

Figure 6:
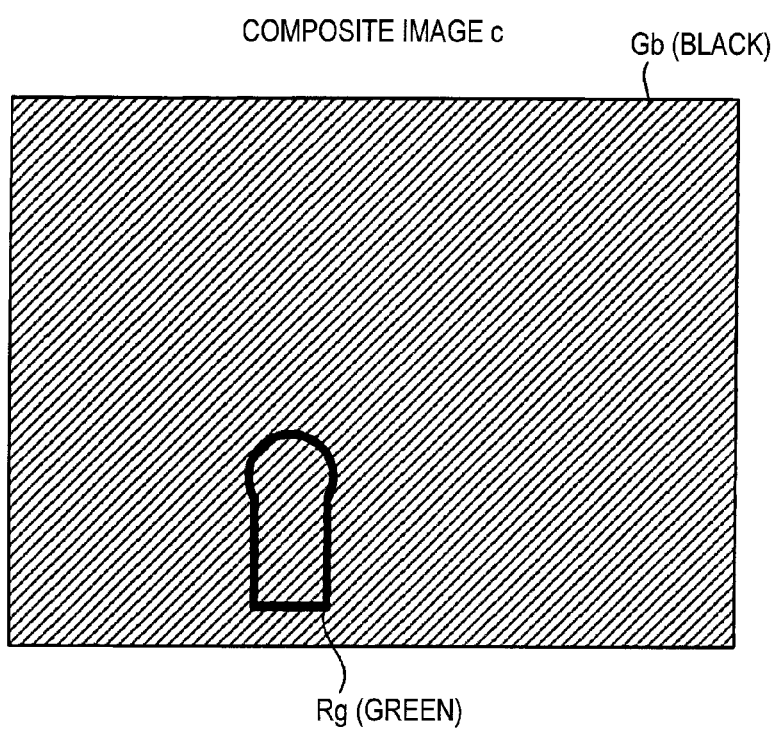
[FIG. 6] A view showing an example of composite image data generated by the composite image generating portion 70 shown in FIG. 2.

Or the composite image generating portion 70 extracts the contour of the person E from the photographic image data shown in FIG. 3 to generate composite image data c in which the other portion than the contour is made into a black image Gb and the contour is made into another color image than black, e.g. a green image Rg as shown in FIG. 6.

Figure 7:
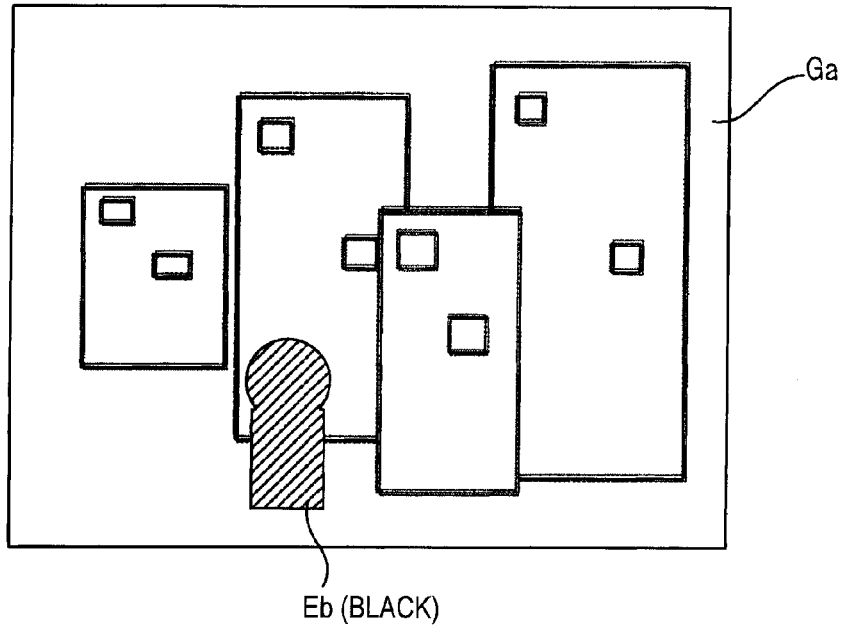
[FIG. 7] A view showing an example of composite image data generated by the composite image generating portion 70 shown in FIG. 2.

Or the composite image generating portion 70 cuts out the person E and the other portion from the photographic image data shown in FIG. 3 to generate composite image data d in which the portion of the person E is made into a black image Eb and the other portion is made into an image Ga blurred by filter processing etc. as shown in FIG. 7.

When any of the composite image data a to d are generated by the composite image generating portion 70, the control portion 32 displays the generated composite image data on the display portion 61 through the display control portion 41.

Incidentally, since the objective optical system 65 and the photographing lens 13 are provided to be shifted from each other in the digital camera 10, there is a parallax between the angle of view of the finder device 15 and the angle of view of the photographing lens 13.

The display portion 61 is disposed in consideration of the parallax so that the position of any point in the composite image data can be consistent with the position in the angle of view of the finder device 15 at a point on the photographic subject corresponding to that point.

Figure 8:
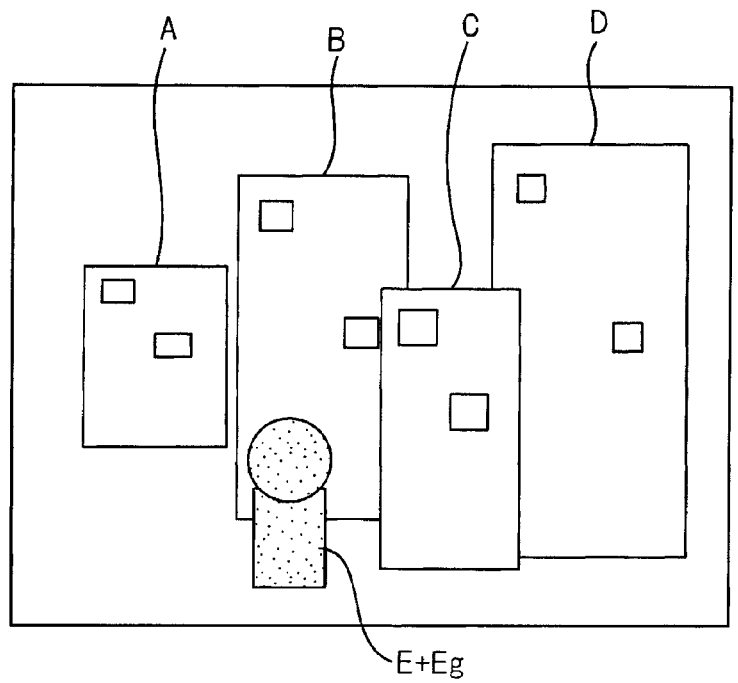
[FIG. 8] A view showing an image which can be viewed through an eyepiece window 17 in the state in which the composite image data shown in FIG. 4 have been superimposed on an OVF optical image.

Therefore, when the display control portion 41 displays the composite image data a on the display portion 61, an image in which the green image Eg is superimposed on the person E on an OVF optical image as shown in FIG. 8 can be observed through the eyepiece window 17.

Figure 9:
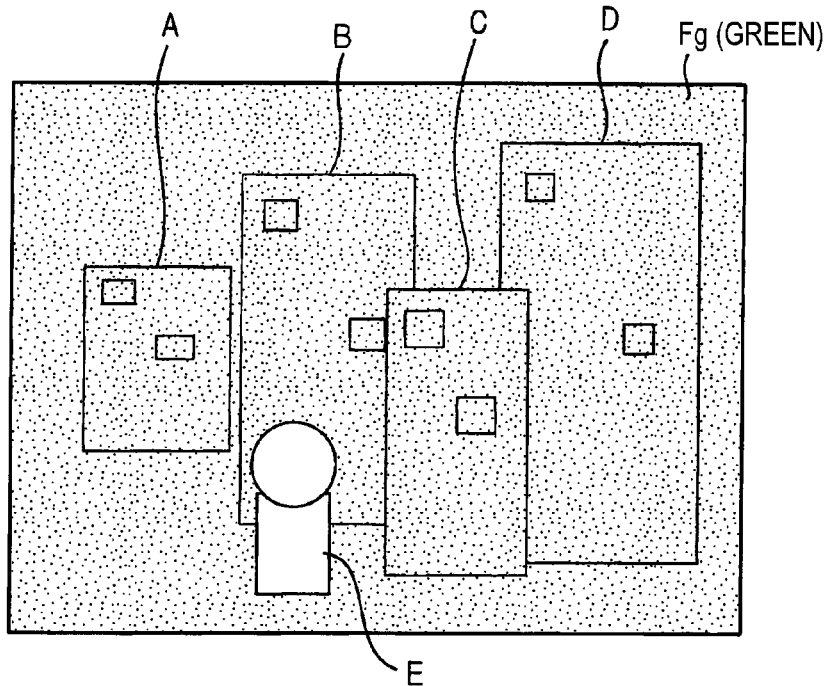
[FIG. 9] A view showing an image which can be viewed through the eyepiece window 17 in the state in which the composite image data shown in FIG. 5 have been superimposed on the OVF optical image.

In addition, when the display control portion 41 displays the composite image data b on the display portion 61, an image in which the green image Fg is superimposed on the background portion other than the person E on the OVF optical image as shown in FIG. 9 can be observed through the eyepiece window 17.

Figure 10:
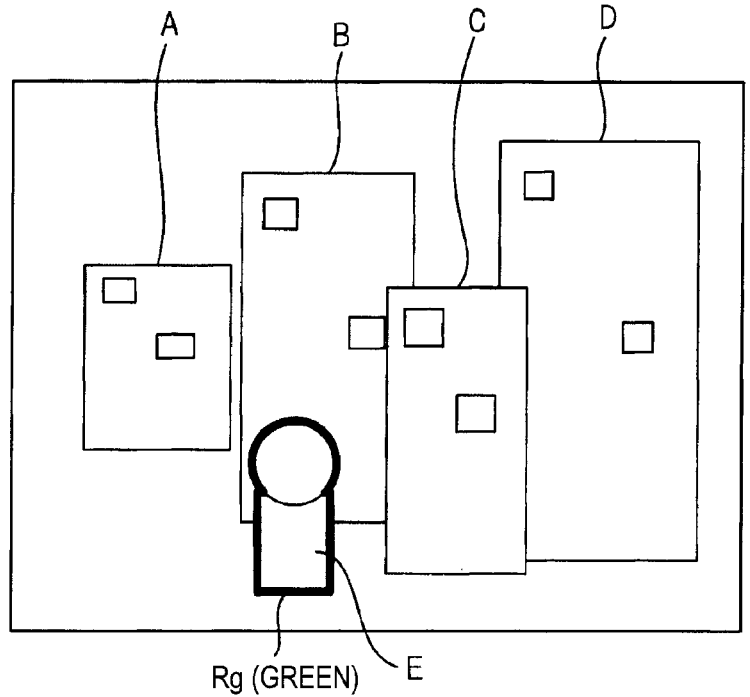
[FIG. 10] A view showing an image which can be viewed through the eyepiece window 17 in the state in which the composite image data shown in FIG. 6 have been superimposed on the OVF optical image.

In addition, when the display control portion 41 displays the composite image data c on the display portion 61, an image in which the green image Rg is superimposed on the contour portion of the person E on the OVF optical image as shown in FIG. 10 can be observed through the eyepiece window 17.

Figure 11:
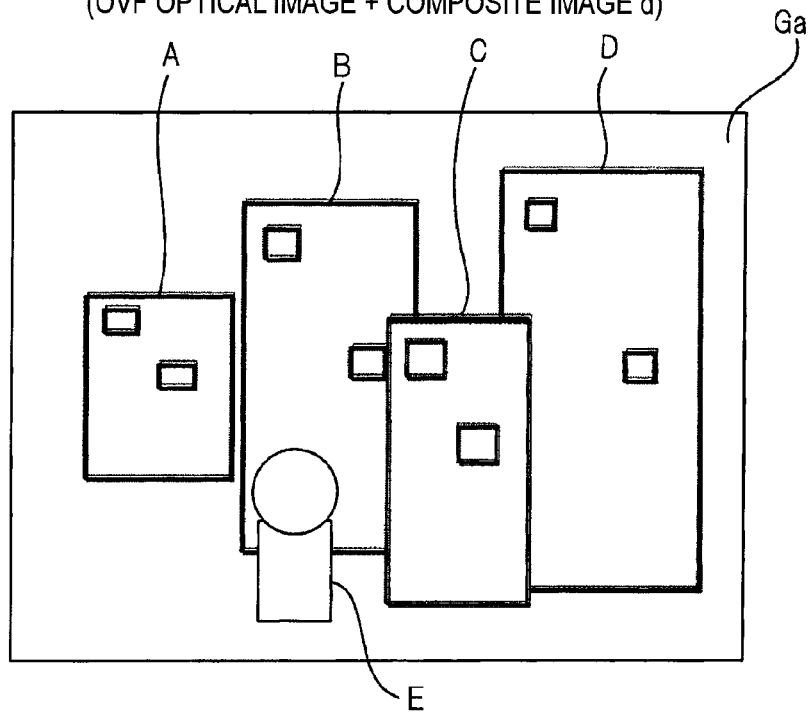
[FIG. 11] A view showing an image which can be viewed through the eyepiece window 17 in the state in which the composite image data shown in FIG. 7 have been superimposed on the OVF optical image.
Figure 12:
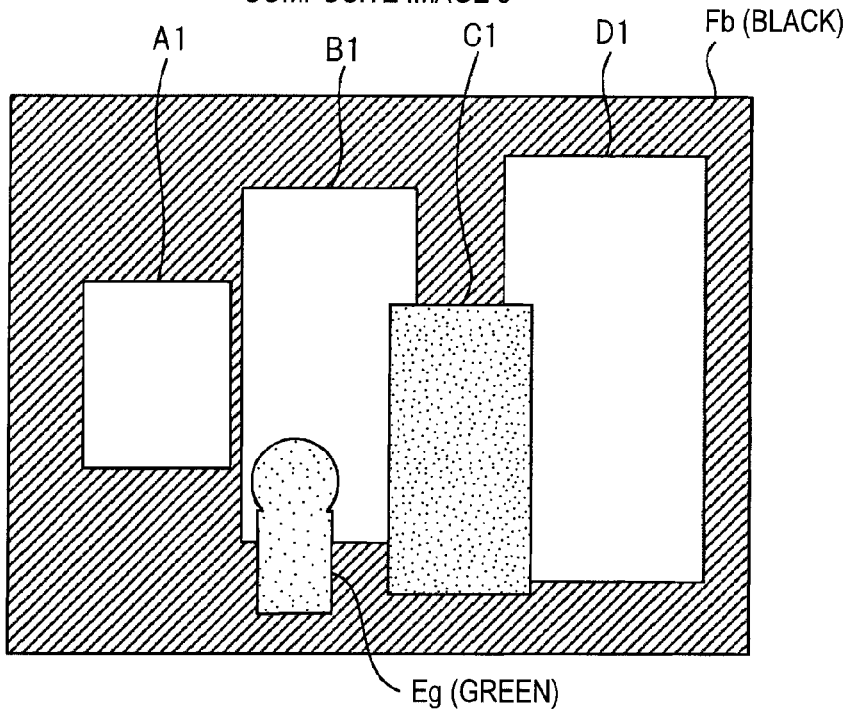
[FIG. 12] A view showing an example of composite image data generated by the composite image generating portion 70 in a first modification of the digital camera 10 shown in FIG. 1.

In addition, when the display control portion 41 displays the composite image data d on the display portion 61, the blurred image of the other portion than the person E on the OVF optical image as shown in FIG. 11 can be observed through the eyepiece window 17.

Operation at the time of a photographing mode of the digital camera 10 configured as described above will be described.

When the mode is set at the photographing mode, the control portion 32 controls the imaging device 21a to start imaging continuously. The phase difference information analyzing portion 71 analyzes a photographic image signal obtained by the imaging and determines a focus region and a non-focus region in the imaged photographic subject. Successively, the composite image generating portion 70 generates composite image data based on the determination result and photographic image data obtained by processing the photographic image signal. When the composite image data are generated, an image based on the composite image data is displayed on the display portion 61 by the display control portion 41.

A user who is looking into the eyepiece window 17 can confirm a focused portion of a photographic subject from an image the user can see through the eyepiece window 17. In order to focus on the portion of the photographic subject, the user operates an operation portion 50 to select an AF area including the portion of the photographic subject. In order to focus on another portion of the photographic subject, the user operates the operation portion 50 to select an AF area including the other portion of the photographic subject. Then, the user issues an AF instruction.

When the AF area is selected and the AF instruction is issued, the phase difference information analyzing portion 71 calculates a moving distance of the focus lens 13b which is required for focusing on the designated AF area, by use of, of the photographic image signal acquired from the imaging device 21a at the time of issuing the AF instruction, signals outputted from the phase difference detecting pixel cells. The phase difference information analyzing portion 71 then transmits information about the moving distance of the focus lens 13b to the control portion 32.

The control portion 32 performs control to move the focus lens 13b in accordance with the information received from the phase difference information analyzing portion 71 to thereby obtain the state in which the designated AF area is in focus.

As described above, according to the digital camera 10, which portion in the photographic subject is in focus is highlighted by an image which is displayed on the display portion 61 and superimposed on an OVF optical image. Accordingly, the focus state in the photographic subject can be known intuitively.

The image displayed on the display portion 61 is generated based on the image taken by the imaging device 21a. Therefore, there occurs a slight time lag. However, since the OVF optical image can be always seen through the eyepiece window 17, which portion of the photographic subject is in focus can be guessed even in the case where, for example, the digital camera 10 moves to displace the position of the image superimposed on the OVF optical image due to the time lag.

Modifications of the digital camera 10 will be described below.

First Modification

In the modification, the phase difference information analyzing portion 71 of the digital camera 10 has not only the aforementioned functions but also a function of calculating distances to respective objects in an imaged photographic subject by use of signals detected by the phase difference detecting pixel cells included in the imaging device 21*a*.

The composite image generating portion 70 acquires photographic image data obtained by processing by the image signal processing circuit 33, to thereby generate composite image data based on the photographic image data, a determination result of a focus region and a non-focus region made by the phase difference information analyzing portion 71, and the distances to the respective objects calculated by the phase difference information analyzing portion 71.

Assume that the phase difference information analyzing portion 71 determines that the person E is a portion corresponding to the focus region and the other portion than the person E is a portion corresponding to the non-focus region in the photographic image data shown in FIG. 3, and further, distances between the digital camera 10 and the buildings A to D increase in the order of the buildings C, D, B and A.

In this case, the composite image generating portion 70 cuts out the person E and the buildings A to D individually from the photographic image data to generate composite image data in which the background other than the cut-out images is made into a black image Fb, the portion of the cut-out person E is made into a green image Eg, and the portions of the buildings A to D are made into images A1, B1, C1 and D1 colored differently in accordance with the distances between the digital camera 10 and the buildings respectively.

For example, the portion of the building C is made into the image C1 with a lighter shade of green than the image Eg. The portion of the building D is made into the image D1 with a lighter shade of green than the image C1. Moreover, the portion of the building B is made into the image B1 with a lighter shade of green than the image D1. The portion of the building A is made into the image A1 with a lighter shade of green than the image B1.

The composite image data generated by the composite image generating portion 70 are displayed on the display portion 61 by the display control portion 41.

Figure 13:
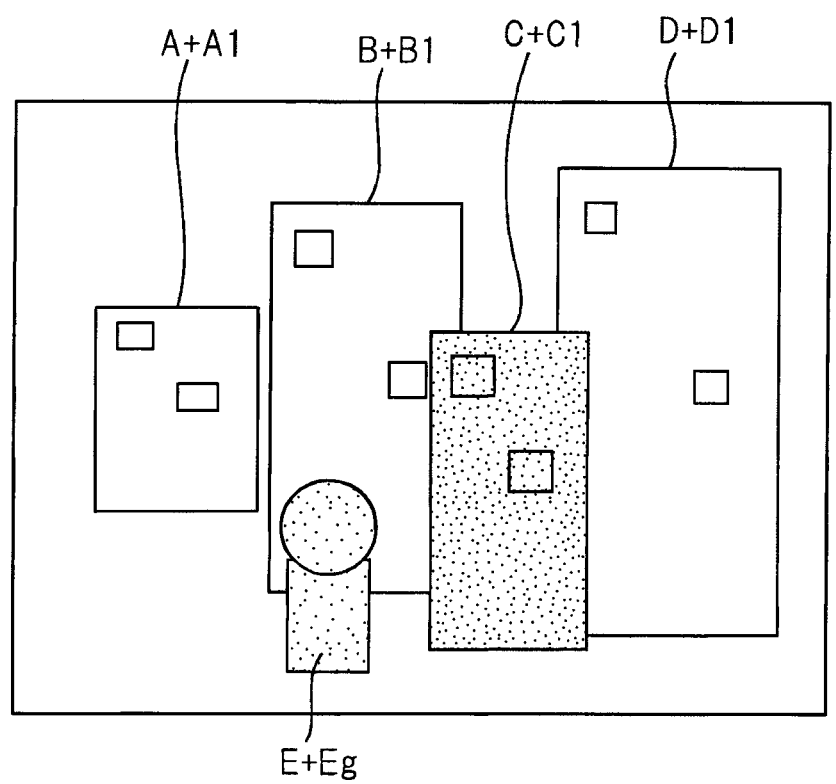
[FIG. 13] A view showing an image which can be viewed through the eyepiece window 17 in the state in which the composite image data shown in FIG. 12 have been superimposed on the OVF optical image.

When the display control portion 41 displays the composite image data on the display portion 61, an image in which the image Eg is superimposed on the person E and the images A1 to D1 are superimposed on the buildings A to D respectively on the OVF optical image as shown in FIG. 13 can be observed through the eyepiece window 17.

Since the images colored differently in accordance with the distances from the digital camera 10 are superimposed on the OVF optical image in this manner, not only the focus state but also the distances to the respective objects can be grasped intuitively. Thus, highly convenient photographing support can be achieved.

Although colored images are superimposed on the respective objects included in the OVF optical image in the finder device 15 in the above description, the colored images may be superimposed to overlap with the contours of the respective objects.

Second Modification

In this modification, the composite image generating portion 70 of the digital camera 10 acquires photographic image data obtained by processing by the image signal processing circuit 33, to cut out an image determined as a portion corresponding to the focus region in the photographic image data. The composite image generating portion 70 enlarges the cut-out image to thereby generate composite image data.

Figure 14A:
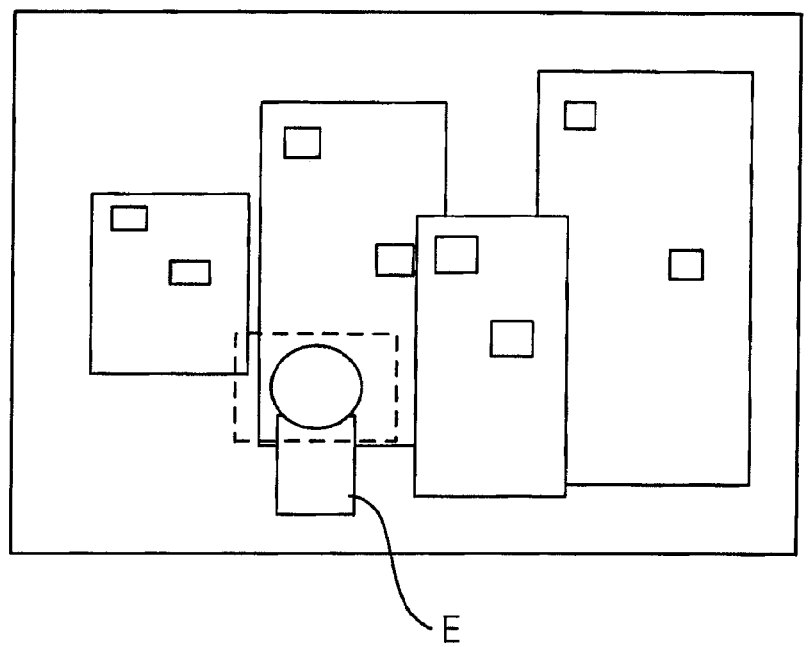
[FIGS. 14A and 14B] Views showing an example of composite image data generated by the composite image generating portion 70 in a second modification of the digital camera 10 shown in FIG. 1.
Figure 14B:
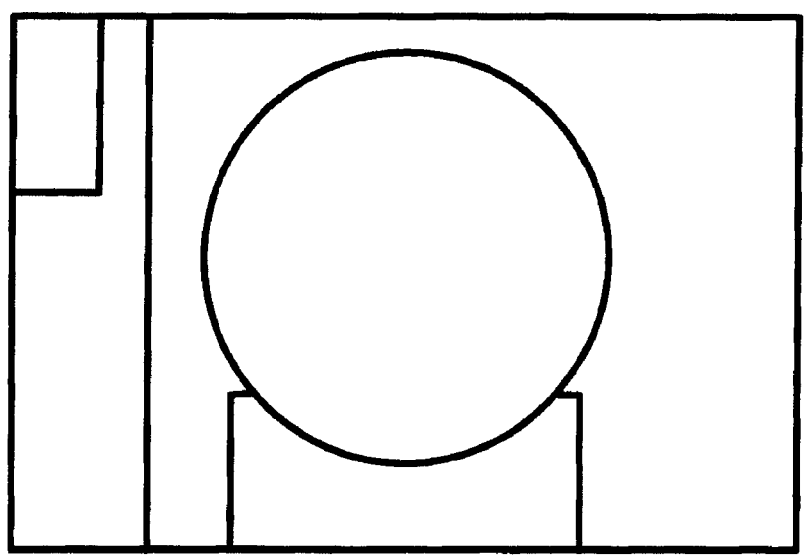

When the phase difference information analyzing portion 71 determines that a person E is the portion corresponding to the focus region and the other portion than the person E is a portion corresponding to the non-focus region in photographic image data shown in FIG. 14A, the composite image generating portion 70 cuts out the person E from the photographic image data shown in FIG. 14A, and enlarges, for example, a portion of the face of the person E (a portion surrounded by a broken line in FIG. 14A) to thereby generate composite image data f shown in FIG. 14B.

Figure 15:
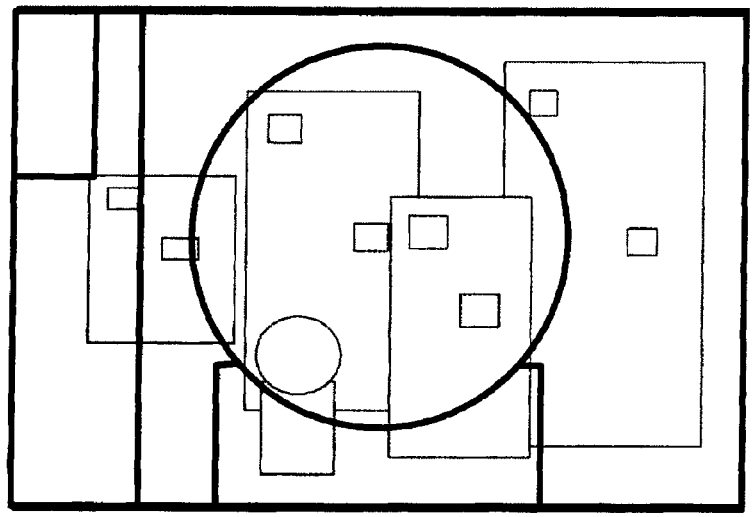
[FIG. 15] A view showing an image which can be viewed through the eyepiece window 17 in the state in which the composite image data shown in FIGS. 14A and 14B have been superimposed on the OVF optical image.

When the display control portion 41 displays the composite image data f on the display portion 61, an image in which the composite image data f are superimposed on the whole of the OVF optical image as shown in FIG. 15 can be observed through the eyepiece window 17.

Due to the image shown in FIG. 15, it is possible to confirm the enlarged image about the focused portion of the photographic subject while confirming the OVF optical image in the background. The size of the image which can be viewed through the eyepiece window 17 is small and the size of the focused portion of the photographic subject in the image is further smaller. According to the modification, the focused portion of the photographic subject is enlarged and superimposed on the OVF optical image. Therefore, the user can know the details of the focused portion of the photographic subject so that user-friendliness of the digital camera can be improved.

Although the composite image generating portion 70 generates an enlarged image of a part of the portion corresponding to the focus region as the composite image data from the photographic image data in the above description, an enlarged image of the whole of the portion corresponding to the focus region may be generated as the composite image data.

Third Modification

In this modification, the OVF shutter 62 of the finder device 15 is constituted by a liquid crystal shutter whose transmissivity can be partially changed.

When the phase difference information analyzing portion 71 determines a focus region and a non-focus region, the control portion 32 controls a transmissive portion and a non-transmissive portion of the OVF shutter 62 so that light from a portion of a photographic subject corresponding to a part of the non-focus region in the angle of view of the finder device 15 can be prevented from entering the eyepiece window 17 of the finder device 15.

Figure 16:
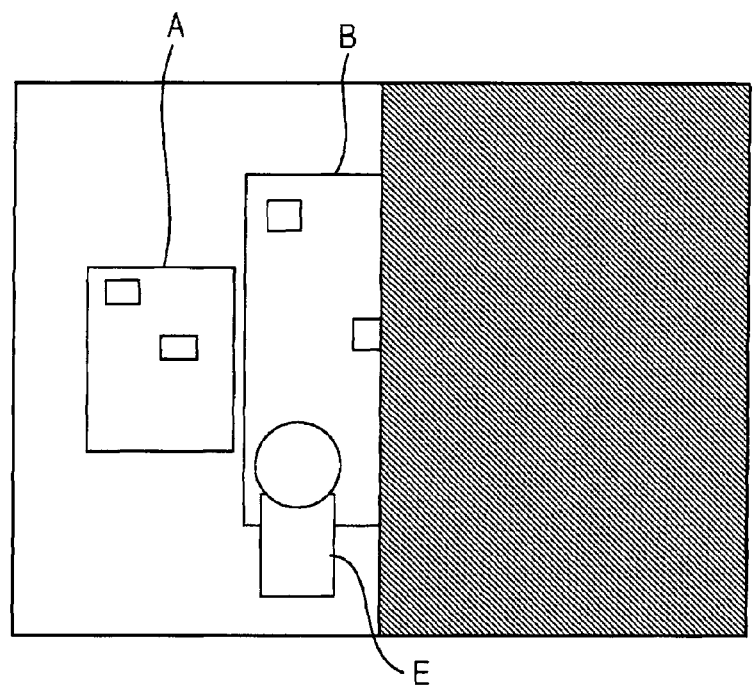
[FIG. 16] A view for describing a control state of an OVF shutter 62 in a third modification of the digital camera 10 shown in FIG. 1.

When, for example, the phase difference information analyzing portion 71 determines that the person E in the left half area is the portion corresponding to the focus region and the other portion than the person E is the portion corresponding to the non-focus region in the photographic image data shown in FIG. 3, the control portion 32 controls the transmissive portion and the non-transmissive portion of the OVF shutter 62 so that the right half of the angle of view of the finder device 15 can be shielded from light. With this control, an image shown in FIG. 16 can be observed through the eyepiece window 17.

Figure 17:
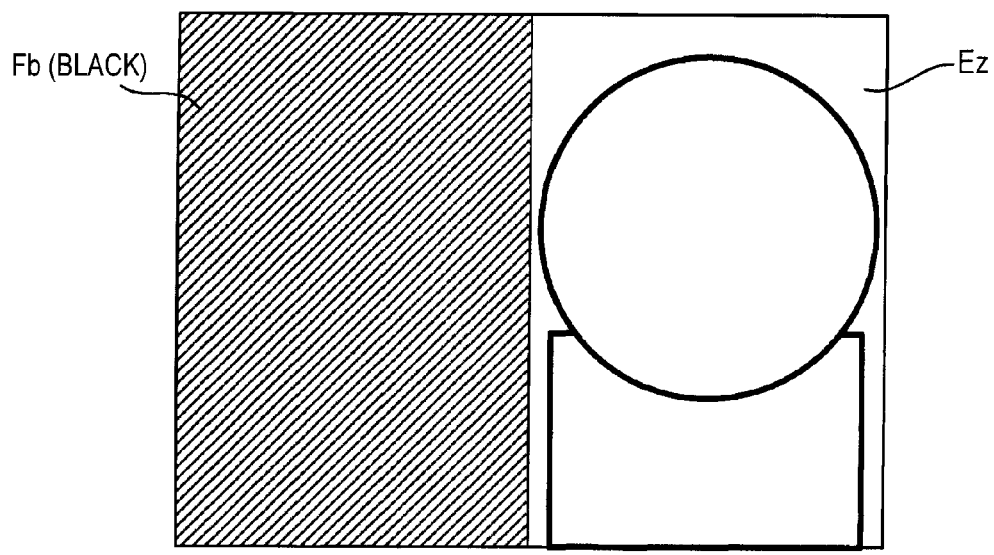
[FIG. 17] A view showing an example of composite image data generated by the composite image generating portion 70 in the third modification of the digital camera 10 shown in FIG. 1.

In addition, the composite image generating portion 70 generates an enlarged image Ez of an image portion which has been determined as the portion corresponding to the focus region in the photographic image data, and generates composite image data g in which the left half of the image data is made into a black image Fb and the right half of the image data is made into the image Ez as shown in FIG. 17.

Figure 18:
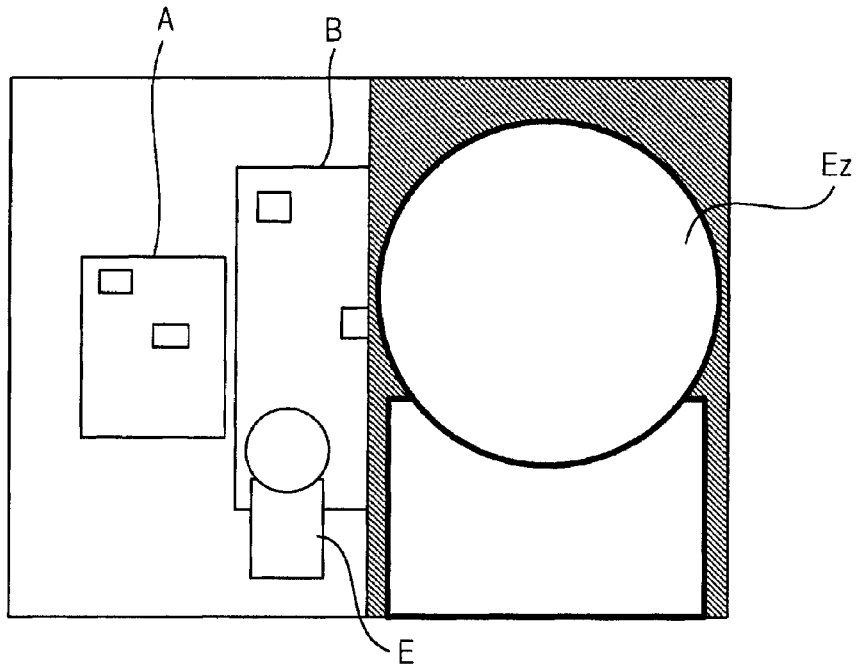
[FIG. 18] A view showing an image which can be viewed through the eyepiece window 17 in the state in which the composite image data shown in FIG. 17 have been superimposed on the OVF optical image.

When the display control portion 41 displays the composite image data g on the display portion 61, an image in which the left half of the OVF optical image and the enlarged image Ez are combined with each other as shown in FIG. 18 can be observed through the eyepiece window 17.

According to the modification, an image in which a state of the focus region seen in a zoom-out mode and a state of the focus region seen in a zoom-in mode are placed side by side can be observed through the eyepiece window 17. Accordingly, the easiness to see a finder observation image can be more improved than that in the second modification.

Although the phase difference information analyzing portion 71 determines a focus region and a non-focus region in an imaged photographic subject by use of signals outputted from phase difference detecting pixel cells in the aforementioned embodiment, the determination method is not limited thereto. When, for example, a twin-lens reflex camera having a plurality of imaging portions is used, a focus region and a non-focus region can be determined or distances to respective objects included in a photographic subject can be calculated based on images from the two imaging portions. In addition, even when a camera having only one imaging portion is used, a focus region and a non-focus region in a photographic subject can be determined by a contrast AF method.

Although a digital camera is used as the imaging apparatus by way of example herein, the invention can be applied to any imaging apparatus as long as it is mounted with a finder device. For example, the technique according to the embodiment can be applied also in the case where a finder device is provided in a camera-including smartphone.

As described above, the following items are disclosed herein.

The disclosed imaging apparatus includes: an imaging device which images a photographic subject; an optical finder through which a photographic subject optical image formed by an optical system can be observed; a display portion which displays an image and is provided inside the optical finder so that an image in which the photographic subject optical image and the image are superimposed on each other can be observed; a focus state determining portion which determines a focus region and a non-focus region in a photographic subject using a photographic image obtained from the photographic subject imaged by the imaging device; and a control portion which makes control to display an image for highlighting the focus region in the photographic subject optical image as the image on the display portion in the state in which the photographic subject optical image can be observed through the optical finder.

The control portion of the disclosed imaging apparatus displays an image overlapping with the focus region, the contour of the focus region or the non-focus region in the photographic subject optical image, as the image for highlighting the focus region.

The image overlapping with the non-focus region in the photographic image optical image in the disclosed imaging apparatus includes an image obtained by blurring processing applied to a portion corresponding to the non-focus region in the photographic image.

The disclosed imaging apparatus further includes: an object distance calculating portion which calculates distances between objects included in the photographic subject and the imaging apparatus by use of the photographic image; wherein: the control portion displays an image overlapping with the focus region or the contour of the focus region in the photographic subject optical image, as the image for highlighting the focus region, and displays, in the non-focus region in the photographic subject optical image, images overlapping with objects located in the non-focus region or the contours of the objects located in the non-focus region with different colors in accordance with the distances between the objects and the imaging apparatus calculated by the object distance calculating portion.

The control portion of the disclosed imaging apparatus displays, on the display portion, an enlarged image of at least a part of a portion corresponding to the focus region in the photographic image, as the image for highlighting the focus region.

The disclosed imaging apparatus further includes: a shutter for partially blocking light incident on the optical system; wherein: in the state in which the control portion has controlled the shutter to prevent a part of the non-focus region in the photographic subject optical image from entering the eyepiece window, the control portion displays the enlarged image in a position overlapping with a region blocked by the shutter in the photographic subject optical image.

The disclosed photographing support method performed by an imaging apparatus is a photographing support method performed by an imaging apparatus including an imaging device which images a photographic subject, an optical finder through which a photographic subject optical image formed by an optical system can be observed, and a display portion which displays an image and is provided inside the optical finder so that an image in which the photographic subject optical image and the image are superimposed on each other can be observed, includes: a focus state determining step of determining a focus region and a non-focus region in a photographic subject by use of a photographic image obtained from the photographic subject imaged by the imaging device; and a control step of making control to display an image for highlighting the focus region in the photographic subject optical image, as the image on the display portion in the state in which the photographic subject optical image can be observed through the optical finder.

INDUSTRIAL APPLICABILITY

According to the invention, it is possible to provide an imaging apparatus and a photographing support method in which a focus state in a photographic subject can be known intuitively while an actual state of the photographic subject is confirmed.

Although the invention has been described above along with a specific embodiment, the invention is not limited to this embodiment but may be changed variously without departing from the disclosed technical ideas of the invention.

The present application is based on a Japanese patent application (Patent Application No. 2012-074312) filed on Mar. 28, 2012, the contents of which will be incorporated herein.

REFERENCE SIGNS LIST 10 digital camera
15 finder device
17 eyepiece window
21a imaging device
32 control portion
61 display portion
70 composite image generating portion
71 phase difference information analyzing portion

The invention claimed is:

1. An imaging apparatus comprising:
   an imaging device which images a photographic subject;
   an optical finder through which a photographic subject optical image formed by an optical system can be observed;
   a display portion which displays an image and is provided inside the optical finder so that an image in which the photographic subject optical image and the image are superimposed on each other can be observed;
   a focus state determining portion which determines a focus region and a non-focus region in a photographic subject using a photographic image obtained from the photographic subject imaged by the imaging device; and
   a control portion which makes control to display on the display portion an image for highlighting the focus region in the photographic subject optical image as the image displayed on the display portion in the state in which the photographic subject optical image can be observed through the optical finder, the image for highlighting the focus region being generated based on the photographic image obtained from the photographic subject imaged by the imaging device and a determination result of the focus state determining portion,
   wherein the control portion displays an image overlapping with the focus region, the contour of the focus region or the non-focus region in the photographic subject optical image, as the image for highlighting the focus region, and
   the image overlapping with the non-focus region is an image obtained by blurring processing applied to a portion corresponding to the non-focus region in the photographic image.

2. The imaging apparatus according to claim 1, further comprising: an object distance calculating portion which calculates distances between objects included in the photographic subject and the imaging apparatus by use of the photographic image,
   wherein the control portion displays an image overlapping with the focus region or the contour of the focus region in the photographic subject optical image, as the image for highlighting the focus region, and displays, in the non-focus region in the photographic subject optical image, images overlapping with objects located in the non-focus region or the contours of the objects located in the non-focus region with different colors in accordance with the distances between the objects and the imaging apparatus calculated by the object distance calculating portion.

3. An imaging apparatus comprising:
   an imaging device which images a photographic subject;
   an optical finder through which a photographic subject optical image formed by an optical system can be observed;
   a display portion which displays an image and is provided inside the optical finder so that an image in which the photographic subject optical image and the image are superimposed on each other can be observed;
   a focus state determining portion which determines a focus region and a non-focus region in a photographic subject using a photographic image obtained from the photographic subject imaged by the imaging device;
   a control portion which makes control to display on the display portion an image for highlighting the focus region in the photographic subject optical image as the image displayed on the display portion in the state in which the photographic subject optical image can be observed through the optical finder, the image for highlighting the focus region being generated based on the photographic image obtained from the photographic subject imaged by the imaging device and a determination result of the focus state determining portion; and
   a shutter for partially blocking light incident on the optical system,
   wherein the control portion displays, on the display portion, an enlarged image of at least a part of a portion corresponding to the focus region in the photographic image, as the image for highlighting the focus region, and
   in the state in which the control portion has controlled the shutter to prevent a part of the non-focus region in the photographic subject optical image from entering an eyepiece window of the optical finder, the control portion displays the enlarged image in a position overlapping with a region blocked by the shutter in the photographic subject optical image.

4. A photographing support method performed by an imaging apparatus including an imaging device which images a photographic subject, an optical finder through which a photographic subject optical image formed by an optical system can be observed, and a display portion which displays an image and is provided inside the optical finder so that an image in which the photographic subject optical image and the image are superimposed on each other can be observed, the method comprising:
   a focus state determining step of determining a focus region and a non-focus region in a photographic subject using a photographic image obtained from the photographic subject imaged by the imaging device; and
   a control step of making control to display on the display portion an image for highlighting the focus region in the photographic subject optical image as the image displayed on the display portion in the state in which the photographic subject optical image can be observed through the optical finder, the image for highlighting the focus region being generated based on the photographic image obtained from the photographic subject imaged by the imaging device and a determination result of the focus state determining step,
   wherein the control step displays an image overlapping with the focus region, the contour of the focus region or the non-focus region in the photographic subject optical image, as the image for highlighting the focus region, and
   the image overlapping with the non-focus region is an image obtained by blurring processing applied to a portion corresponding to the non-focus region in the photographic image.

5. A photographing support method performed by an imaging apparatus including an imaging device which images a photographic subject, an optical finder through which a photographic subject optical image formed by an optical system can be observed, a display portion which displays an image and is provided inside the optical finder so that an image in which the photographic subject optical image and the image are superimposed on each other can be observed, and a shutter for partially blocking light incident on the optical system, the method comprising:
   a focus state determining step of determining a focus region and a non-focus region in a photographic subject using a photographic image obtained from the photographic subject imaged by the imaging device; and
   a control step of making control to display on the display portion an image for highlighting the focus region in the photographic subject optical image as the image displayed on the display portion in the state in which the photographic subject optical image can be observed through the optical finder, the image for highlighting the focus region being generated based on the photographic image obtained from the photographic subject imaged by the imaging device and a determination result of the focus state determining step, wherein the control step displays, on the display portion, an enlarged image of at least a part of a portion corresponding to the focus region in the photographic image, as the image for highlighting the focus region, and in the state in which the control step has controlled the shutter to prevent a part of the non-focus region in the photographic subject optical image from entering an eyepiece window of the optical finder, the control step displays the enlarged image in a position overlapping with a region blocked by the shutter in the photographic subject optical image.

\* \* \* \* \*